United States Patent
Reed, Jr. et al.

(10) Patent No.: US 6,332,257 B1
(45) Date of Patent: Dec. 25, 2001

(54) METHOD OF CONVERTING AN EXISTING VEHICLE POWERTRAIN TO A HYBRID POWERTRAIN SYSTEM

(75) Inventors: Richard G. Reed, Jr., Royal Oak; Evan S. Boberg, Hazel Park; Robert E. Lawrie, Whitmore Lake; Francois J. Castaing, Bloomfield Township, all of MI (US)

(73) Assignee: Chrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/383,308

(22) Filed: Aug. 26, 1999

Related U.S. Application Data

(62) Division of application No. 09/302,719, filed on Apr. 30, 1999, now abandoned.

(51) Int. Cl.[7] ............... B23P 17/04; B23P 23/00; B21K 21/16
(52) U.S. Cl. ............... 29/401.1; 475/5; 74/335
(58) Field of Search ............... 29/401.1, 402.01, 29/469; 74/325, 330, 329, 335; 475/5; 192/84.6, 94, 111 A

(56) References Cited

U.S. PATENT DOCUMENTS

| | | | |
|---|---|---|---|
| 4,735,298 | * 4/1988 | Haguel | 192/111 A |
| 5,094,079 | * 3/1992 | Leigh-Monstevens et al. | 192/83 |
| 5,558,589 | * 9/1996 | Schmidt | 475/5 |
| 5,562,565 | * 10/1996 | Moroto et al. | 477/3 |
| 5,624,350 | * 4/1997 | Bates | 477/78 |
| 5,713,425 | * 2/1998 | Buschhaus et al. | 180/65.2 |
| 5,730,676 | * 3/1998 | Schmidt | 475/5 |
| 5,789,823 | * 8/1998 | Sherman | 475/5 |
| 5,993,355 | * 11/1999 | Nordgard | 74/335 |
| 5,996,754 | * 12/1999 | Reed, Jr. et al. | 192/48.2 |

\* cited by examiner

Primary Examiner—David P. Bryant
Assistant Examiner—Jermie E. Cozart
(74) Attorney, Agent, or Firm—Lisa K. Mack

(57) ABSTRACT

A method of converting an existing vehicle powertrain including a manual transmission to a hybrid powertrain system with an automated powertrain transmission. The first step in the method of attaching a gear train housing to a housing of said manual transmission, said gear train housing receiving as end of drive shaft of said transmission and rotatably supporting a gear train assembly. Secondly, mounting an electric motor/generator to said gear train housing and attaching a motor/generator drive shaft of said electric motor/generator to said gear train assembly. Lastly, connecting an electro-mechanical clutch actuator to a friction clutch mechanism of said manual transmission.

7 Claims, 12 Drawing Sheets

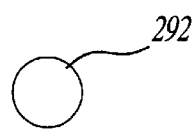 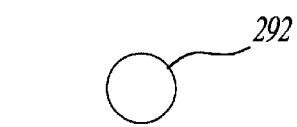 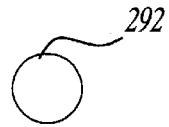
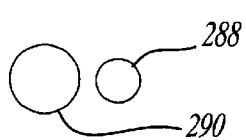  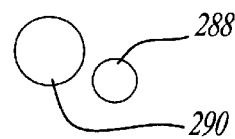
Fig-23a    Fig-23b    Fig-23c
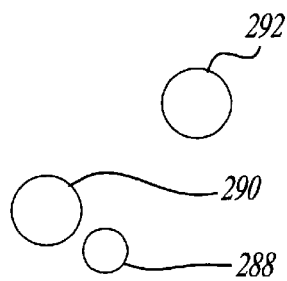 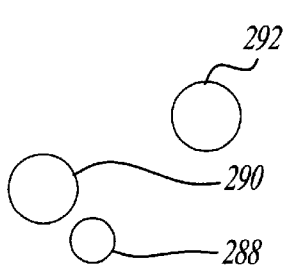 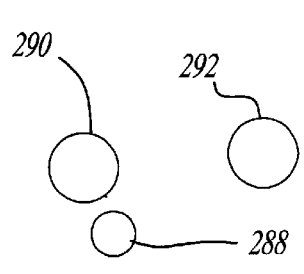
Fig-23d    Fig-23e    Fig-23f
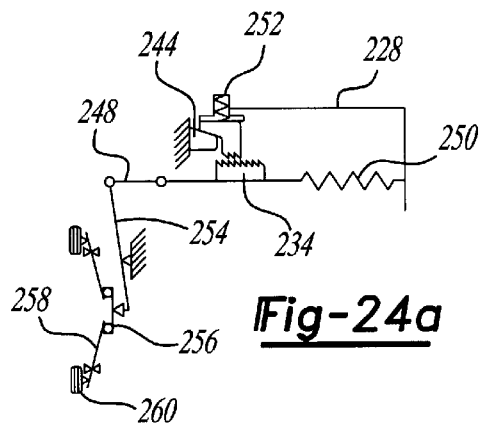 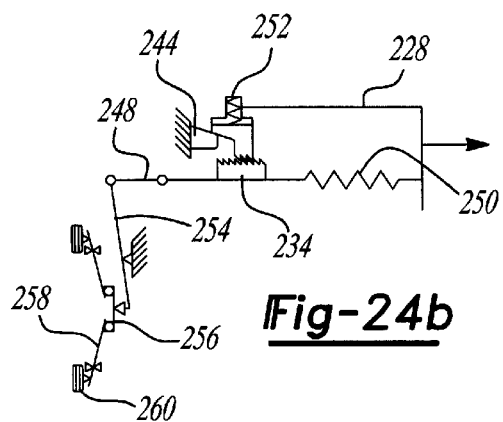
Fig-24a    Fig-24b
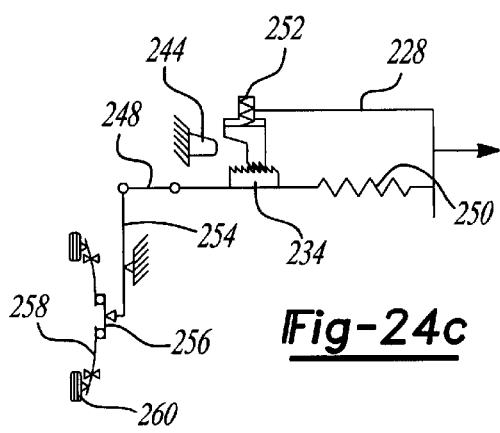 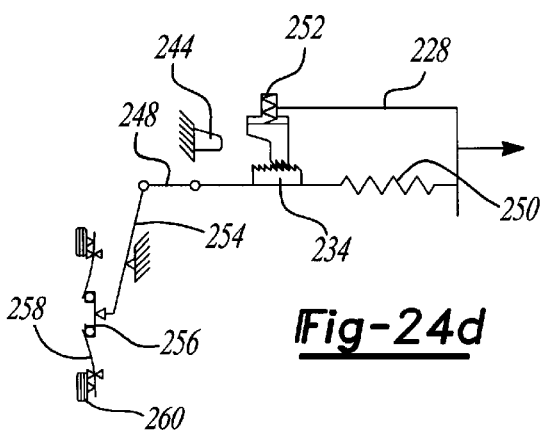
Fig-24c    Fig-24d

METHOD OF CONVERTING AN EXISTING VEHICLE POWERTRAIN TO A HYBRID POWERTRAIN SYSTEM

CROSS REFERENCE TO RELATED APPLICATIONS

This application is a division of pending application Ser. No. 09/302,719 entitled "Powertrain System for a Hybrid Electric Vehicle" filed Apr. 30, 1999 by the same inventors as in the present application which is now abandoned.

STATEMENT OF GOVERNMENT INTEREST

The government of the United States of America has rights in this invention pursuant to Subcontract No. ZAN-6-16334-01 awarded by the U.S. Department of Energy.

BACKGROUND OF THE INVENTION

Field of the Invention

The present invention relates generally to a powertrain system for hybrid electric vehicles and, more particularly, to an automated manual transmission powertrain system for a hybrid electric vehicle having input shaft synchronization using an electric motor.

BACKGROUND AND SUMMARY OF THE INVENTION

Since the invention of power vehicles, many different powertrain systems have been attempted, including a steam engine with a boiler or an electric motor with a storage battery. It was, however, the discovery of petroleum in 1856 and the four-stroke internal combustion engine invented by Otto in 1876, that provided the impetus for the modern motor vehicle industry.

Although fossil fuel emerged as the fuel of choice for motor vehicles, recent concerns regarding fuel availability and increasingly stringent federal and state emission regulations have renewed interest in alternative fuel powered vehicles. For example, alternative fuel vehicles may be powered by methanol, ethanol, natural gas, electricity, or a combination of these fuels.

A dedicated electric powered vehicle offers several advantages: electricity is readily available, an electric power distribution systems is already in place, and an electric powered vehicle produces virtually no emissions. There are, however, several technological disadvantages that must be overcome before electric powered vehicles gain acceptance in the marketplace. For instance, the range of an electric powered vehicle is limited to approximately 100 miles, compared to approximately 300 miles for a similar fossil fuel powered vehicle. Further, the acceleration is significantly less than that of a comparable fossil fuel powered vehicle.

A hybrid powered vehicle, powered by both a renewable and non-renewable energy source, overcomes the technical disadvantages of a dedicated electric vehicle while still offering an environmental benefit. The performance and range characteristics of the hybrid powered vehicle is comparable to a conventional fossil fuel powered vehicle. Thus, there is a need in the art for a hybrid powertrain system for a motor vehicle that is energy efficient, has low emissions, and offers the performance of a conventional fossil fuel powered vehicle. In particular, there is a need for a transmission system to complement the combined electric and gas power plants.

There are presently two typical powertrains for use on the conventional automobile. The first, and oldest, type of powertrain is the manually operated powertrain. These powertrains are typically characterized in that vehicles having manually transmissions include a clutch pedal to the left of a brake pedal and a gear shift lever which is usually mounted at the center of the vehicle just behind the dash board. To operate the manual transmission, the driver must coordinate depression of the clutch and acceleration pedals with the position of the shift lever in order to select the desired gear. Proper operation of a manual transmission is well known to those skilled in the art, and will not be described further herein.

In a vehicle having an automatic transmission, no clutch pedal is necessary, and the standard H configuration of the shift lever is replaced by a shift lever which typically moves back and forth. The driver need only select between park, reverse, neutral, drive, and 1 or 2 low gears. As it is commonly known in the art, the shift lever is placed in one of several positions having the designator P, R, N, D, 2, AND MAYBE 1, which corresponds to park, reverse, neutral, drive, and 1 or 2 low gears, respectively. Vehicle operation when the gear shift lever is placed in one of these positions is well know in the art. In particular, when in drive mode, the transmission automatically selects between the available forward gears. As is well known, older systems typically included first, second, and third gears, while newer systems include first through third gears as well as a fourth and possibly a fifth overdrive gear. The over drive gears provide an improved fuel economy at higher speeds.

As is well known, early transmissions were almost exclusively manually operated transmissions. With a steady development of automatic transmissions, drivers increasingly gravitated toward the easy operation of automatic transmissions. However, in the mid 1970's, rising concerns about present and future fossil fuel shortages resulted in implementation of corporation average fuel economy regulations prorogated in several countries. These fuel economy requirements necessitated the investigation of increasing the fuel economy of motor vehicles in order to meet government regulations. These government regulations prompted a gradual return to manual transmissions which are typically more efficient than automatic transmissions.

In the ensuing years, many mechanically operated vehicle systems were replaced or at least controlled by electronic control systems. These electronic control systems greatly increase the fuel efficiency of vehicle engines and enabled a gradual return to the convenience of automatic transmissions. In addition, electronic controls placed on automatic transmissions, greatly improved the shift schedule and shift feel of automatic transmissions and also enabled implementation of fourth and fifth overdrive gears, thereby increasing fuel economy. Thus, automatic transmissions have once again become increasingly popular.

Automatic and manual transmissions offer various competing advantages and disadvantages. As mentioned previously, a primary advantage of a manual transmission is improved fuel economy. Conversely, automatic transmissions first and foremost offer easy operation, so that the driver need not burden both hands, one for the steering wheel and one for the gear shifter, and both feet one for the clutch and one for the gas and break while driving. When operating a manual transmission, the driver has both one hand and one foot free. In addition, an automatic transmission provides extreme convenience in stop and go situations, as the driver need not worry about continuously shifting gears to adjust to the ever changing speed of traffic.

With respect to a hybrid vehicle, however, manual transmissions prove to be particularly advantageous to increasing efficiency, thereby improving fuel economy. The primary reason for the superior efficiency of the manual transmission for the hybrid vehicle lies in the basic operation of the automatic transmission. In most automatic transmissions, the output of the engine connects to the input of the transmission through a torque converter. Most torque converters have an input turbine that is connected to the output shaft of the engine and an input impeller that is connected to the input shaft of the transmission. Movement of the turbine at the input side results in a hydraulic fluid flow which causes a corresponding movement of the hydraulic impeller connected to the input shaft of the transmission. While torque converters provide a smooth coupling between the engine and the transmission, the hydraulic fluid results in a parasitic loss, thereby decreasing efficiency of the powertrain. Further, the shift operation in an automatic transmission also requires hydraulic fluid pressure, thereby introducing additional parasitic losses of efficiency in the powertrain.

Even with the more efficient manual transmissions, there are substantial losses of kinetic energy due to the friction losses that occur during engagement of the synchronization mechanisms typically used in a manual transmission.

Before a shift between the gear ratios of a manual transmission can occur, it is necessary to synchronize the rotational speed of the drive shaft with the rotational speed of the driven shaft. Typically, synchronization is obtained in a manual transmission by way of a synchronizing mechanism such as a mechanical synchronizer which is well known in the art. The mechanical synchronizer varies the speed of drive shaft to match the speed of the driven shaft to enable smooth engagement of the selected gear set. For example, during an upshift, the mechanical synchronizer utilizes frictional forces to decrease the rate of rotation of the drive shaft so that the desired gear on the drive shaft is engaged smoothly to drive the desired gear of the driven shaft. Conversely, during a downshift, the mechanical synchronizer increases the rate of rotation of the drive shaft so that the desired gear is engaged smoothly to drive the desired gear on the driven shaft.

Thus, there is a need in the art for a powertrain system having an efficient transmission which limits kinetic losses due to mechanical synchronizers as well as parasitic losses due to hydraulic control.

Further, in a typical hybrid powertrain system, the electric motor is connected to the drive wheels downstream of the transmission output shaft. Accordingly, at low vehicle speeds the electric motor is driven relatively slowly when operating in the regenerative mode. However, the efficiency of the electric motor is greatly reduced at these relatively low speeds. In addition, typical hybrid powertrain systems have utilized large electric motors which are capable of providing all of the drive torque necessary for driving the vehicle. These large electric motors are typically 75–100 Kw motors which are extremely expensive and heavy. The system of the present invention provides a mild hybrid powertrain system which uses a smaller electric motor (approximately 15 kW) connected to the input/drive shaft of an automated manual-type transmission. The electric motor is used in limited situations for providing driving torque for propelling the vehicle. The electric motor also operates as a generator and because it is drivingly connected to the input shaft of the transmission, the electric motor is still driven at relatively high speeds even when the vehicle speed is low in order to provide more efficient regeneration.

The present invention also provides a hybrid powertrain system that utilizes an electric motor/generator to synchronize a speed of a transmission drive shaft with a speed of a transmission driven shaft. The present invention also provides a transmission for a hybrid powertrain system which is electro-mechanically controlled to substantially operate as an automated manual transmission, thereby eliminating parasitic loses due to hydraulic fluid flow. Also, a method of retrofitting an existing manual transmission to become an automated manual transmission and/or a method of converting a powertrain system having an engine and a manual transmission into a hybrid electric powertrain system, is also provided.

To achieve the foregoing objects, the present invention provides a hybrid powertrain system, including an internal combustion engine having an engine output shaft; a transmission including a transmission drive shaft coupled to the internal combustion engine by a friction clutch mechanism, the transmission further including a transmission driven shaft selectively driven at a plurality of gear ratios relative to the transmission drive shaft; an electric motor/generator drivingly engaged with the transmission drive shaft; wherein the electric motor/generator is utilized to synchronize rotation of the transmission drive shaft with the driven shaft.

One advantage of the present invention is that the automated manual-style transmission provides a more efficient transmission system by eliminating parasitic losses due to hydraulic fluid flow. Another advantage of the present system is that an electronic controller automatically controls the manual-style transmission so that the transmission operates as a functional equivalent to an automatic transmission to the driver. Another advantage of the present invention is that during a shift, the electric motor substantially synchronizes the speed of the input shaft with the speed of the output shaft of the transmission.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIGS. 23a–23f illustrate the relative position of the assist lever of the assist cam assembly during various ranges of travel during actuation of the clutch actuator;

FIGS. 24a–24d schematically illustrate the operation of the wear compensator according to the principles of the present invention;

DETAILED DESCRIPTION OF THE PREFERRED EMBODIMENTS

Figure 1:
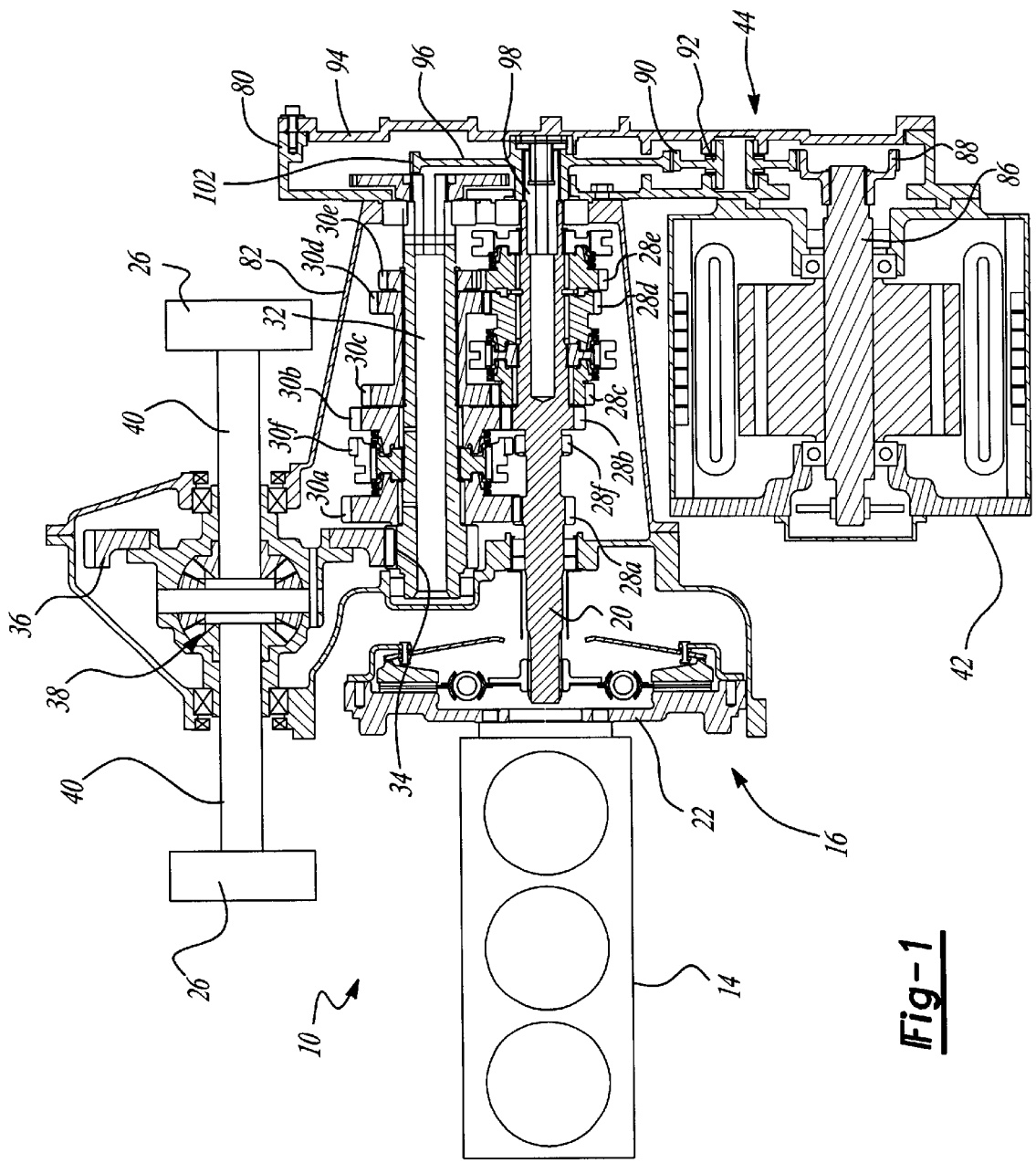
FIG. 1 is a cross-sectional view of a hybrid powertrain system for a motor vehicle according to the principles of the present invention.
Figure 2:
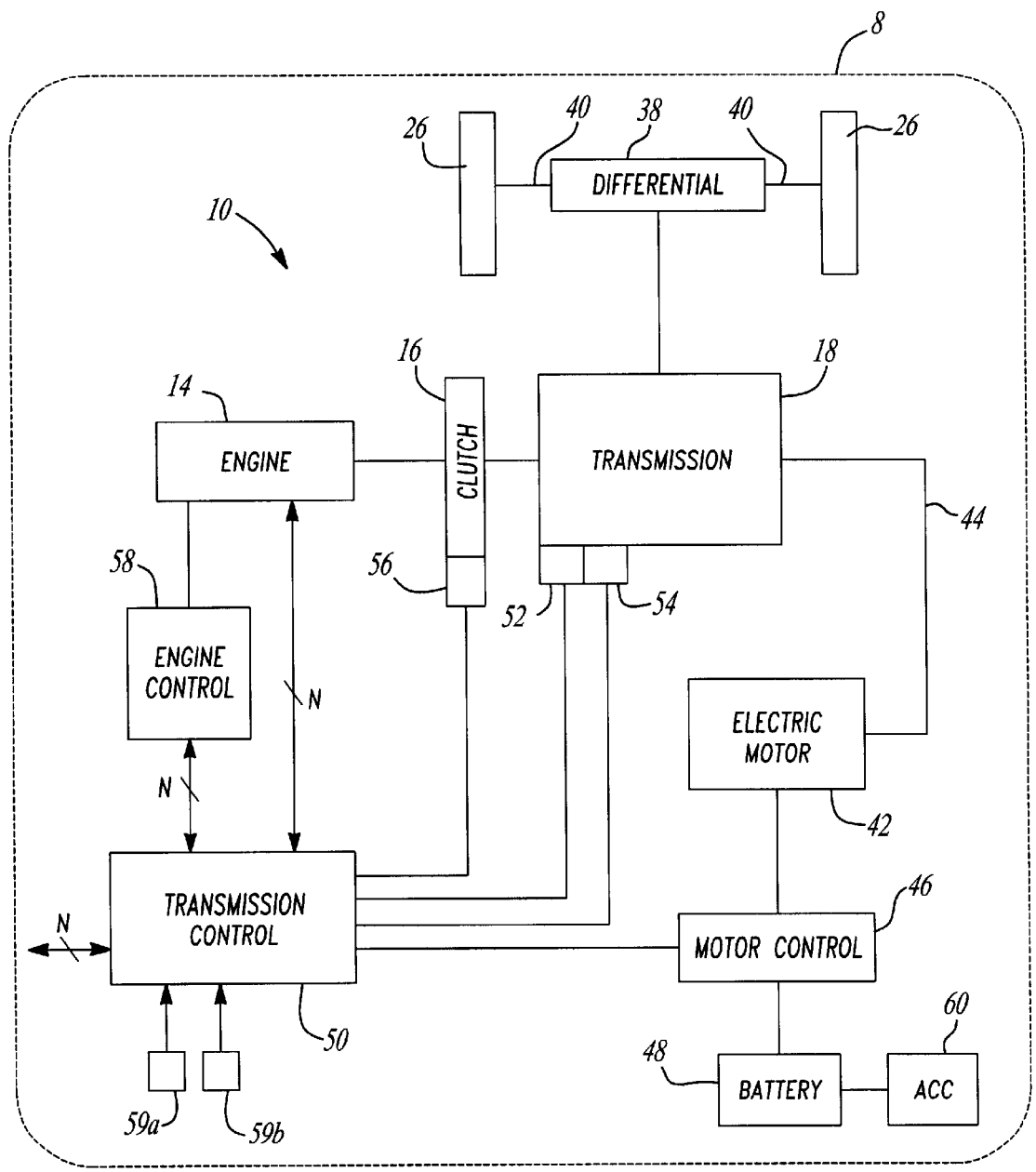
FIG. 2 is a schematic diagram of the hybrid powertrain system including the electrical connections according to the principles of the present invention.

Referring to FIGS. 1 and 2, a hybrid powertrain system 10, according to the present invention, is illustrated for a motor vehicle, generally shown at 8. The hybrid powertrain system 10 includes a heat engine 14 operating on a hydrocarbon based or fossil fuel. In this example, the engine 14 is a compression-ignited engine fueled by a diesel fuel. Preferably, the engine 14 is sized comparable to a diesel engine for a non-hybrid motor vehicle.

The hybrid powertrain system 10 includes a clutch mechanism 16, as is known in the art, for operably interconnecting engine 14 and transmission 18. The Clutch mechanism 16 compensates for the difference in rotational speed of engine 14 and transmission 18, to smooth engagement between the engine 14 and the transmission 18.

Transmission 18 includes a drive or input shaft 20 (hereinafter referred to as "drive shaft 20") which connects to an engine output shaft 22 through clutch 16 and transmits engine rotation and power at various ratios to the drive wheels of the motor vehicle. Thus, transmission 18 enables the motor vehicle to accelerate through predetermined gear ratios, while engine 14 functions within a predetermined operating range. Examples of known transmission types include an automatic transmission, a manual transmission, and a continuously variable transmission. It should be appreciated that in a preferred embodiment of the present invention as shown, transmission 18 is a five-speed manual transmission as is well known in the art.

The drive shaft 20 of the transmission 18 is operatively connected to clutch mechanism 16. Drive shaft 20 supports a plurality of drive gears 28a–f which are engaged with a plurality of driven gears 30a–f supported on an output or driven shaft 32 (hereinafter referred to as "driven shaft 32"). Driven shaft 32 includes an output gear 34 which meshingly engages with an input gear 36 of a differential unit 38. The differential unit 38 engages a pair of axle shafts 40 which are operably connected to the drive wheels 26, and selectively provide power to the drive wheels 26 in accordance with the operation of a differential unit as is known to those skilled in the art.

The operation of engine 14 produces a torque output which, through clutch mechanism 16, causes the drive shaft 20 to rotate at a first rate. Concurrently, driven shaft 32 rotates at a second rate related to a rate of rotation of the drive shaft 20 and the particular engaged gear set of drive shaft 20 and driven shaft 32. Similarly, the driven shaft 32 drives the differential unit 38 for driving axle shafts 40 and wheels 26.

The hybrid powertrain system 10 also includes an electric motor/generator 42 (hereinafter referred to as "electric motor 42") operably connected to transmission 18 at the opposite end of drive shaft 20 from clutch 16. Electric motor 42 is connected to input shaft 20 opposite from clutch 16 by a gear train 44. The electric motor 42 is able to provide both positive and regenerative torque, by functioning as a motor and a generator, respectively. An example of an electric motor 42 is an induction motor or a permanent magnet motor, which is available from Delphi Corporation.

As a generator, electric motor 42 is driven by the drive shaft 20 and produces a regenerative torque, preferably as an alternating current (A/C), which is transferred to a control mechanism, such as motor controller 46. Motor controller 46 changes the alternating current into a direct current (D/C), as is well known in the art. The direct current may then be transmitted to an energy storage apparatus 48, such as a battery. Alternatively, as a motor, the electric motor 42 produces a positive torque that is applied to the drive shaft 20 of the transmission 18 and ultimately provides torque to drive wheels 26. The system of the present invention provides a mild hybrid powertrain system which uses a small electric motor 42 (less than 50 Kw and preferably approximately 15 kW) connected to the drive shaft 20. Typically, hybrid powertrain systems utilize much larger motors such as 75 and 100 Kw motors. The electric motor 42 is used in limited situations for providing driving torque for propelling the vehicle. The electric motor 42 also operates as a generator and because it is drivingly connected to the drive shaft 20 of the transmission 18, the electric motor 42 is still driven at high speeds even when the vehicle speed is low in order to provide more efficient regeneration.

Hybrid powertrain system 10 also includes a transmission controller 50, such as an electronic control unit. Transmission controller 50 enables electronic control of transmission 18 to enable the transmission 18 to be configured as a manual-style transmission, but to be operated from a drivers standpoint as an automatic transmission. To effect such operation, transmission 18 has a pair of electro-mechanical shift actuators 52, 54 which simulate positioning of the stick shift actuators as in a conventional manual transmission. Further, an electro-mechanical clutch actuator 56 enables operation of clutch 16 in replacement of a clutch pedal as on a conventional manual transmission. In order to generate such control signals, transmission controller 50 receives input signals from engine 14 or an engine controller 58. Examples of such information received from engine 14 or engine controller 58 include vehicle speed, RPM, and the like. Similarly, transmission controller 50 generates output signals to control actuators 52, 54, and 56 and also outputs diagnostic and other communication signals to engine 14 and/or engine controller 58. Transmission controller 50 may also receive other vehicle condition signals, depending on a particular configuration of the transmission controller 50.

In this example, the electric motor 42 is positioned to rotate drive shaft 20, although other configurations are possible. By configuring electric motor 42 to rotate drive shaft 20, electric motor 42 eliminates the need for the mechanical synchronizers as required by standard manual transmissions. In particular, rotation sensors 59a, 59b are used to sense the rotational speed of drive shaft 20 and driven shaft 32, respectively. Transion controller 50 generates control signals to electric motor 42 through motor controller 46, to effect activation and deactivation of electric motor 42. Activation and deactivation of electric motor 42 enables varying the speed of the drive shaft 20 through gear train 44 so that synchronization of drive shaft 20 and driven shaft 22 may be achieved (taking into consideration the gear ratio of the selected gear) to engage the desired gears. During an upshift, the electric motor 42 is operated as a generator to apply torque to the drive shaft 20 to slow down the drive shaft 20 for synchronizing the drive shaft 20 with the drive shaft 32. The regenerative torque is applied by the electric motor 42. The regenerative mode produces potential energy which is stored in the battery. During a downshift, the electric motor is driven to increase the rotational speed of the drive shaft 32 to synchronize the rotation with the driven shaft 32. Via this process, electric motor 42 is able to synchronize the inertia of drive shaft 20 of the transmission 18 with the driven shaft 32, thereby eliminating the need for the mechanical synchronizer which is typically employed in a manual transmission.

Another example of a capability of the electric motor 42 is to start the engine 14. Electric motor 42, while functioning as a motor, may initiate the torque and rotational speed necessary to rotate drive shaft 20, and through engagement of clutch mechanism 16, start engine 14. Therefore, a starter motor, as is known in the art, is unnecessary.

The hybrid powertrain system 10 also includes a braking system (not shown) operably connected to the wheels. An example of a known braking system is a driver assisted hydraulic braking system, known in the art. The driver operates a brake pedal (not shown) to mechanically apply a braking force to slow down the spinning of drive wheels 26 or maintain drive wheels 26 in a stationary position. However, with a hydraulic braking system, the momentum of the motor vehicle, in the form of kinetic energy, is usually lost.

A preferred type of braking system for use with the present invention also includes a regenerative braking system, capable of capturing kinetic energy from the momentum of the motor vehicle as it is slowing down and storing this energy as potential energy in the energy storage apparatus 48. Electric motor 42 slows the motor vehicle down by applying a braking force that slows down the rotation of drive axles 40. During the regenerative braking, electric motor 42 functions as a generator and captures the reverse energy flow as potential energy in the form of electricity.

In operation, as will be described in greater detail herein, transmission controller 50 receives input signals from engine 14, engine controller 58, clutch 16, clutch actuator 56, transmission 18, and through additional sensors. With reference to clutch actuator 56, this actuator is preferably a rotary actuator which causes linear movement to effect engagement and disengagement of clutch 16.

Transmission controller 50 causes shifting of gears through shift actuators 52 and 54. With respect to actuators 52 and 54, these actuators combine to mimic movement of the shift lever in a conventional manual transmission. That is, in visioning the typical "H" shift configuration, shift actuator 52 may operate as the cross over actuator, i.e., determining what leg of the "H" the shifter is in. Similarly, shift actuator 54 operates as a select actuator which mimics an upward or downward movement of the shifter within the leg of the "H". The actuators 52, 54, and 56 receive control signals from transmission controller 50 to operate the shifting portion of transmission 18 as in a conventional manual transmission.

Hybrid powertrain system 10 includes an energy storage apparatus 48, such as a battery, to store potential energy for later use by the motor vehicle. For example, the potential energy stored in the battery may be transferred, as DC current, to operate an accessory component 60.

Hybrid powertrain system 10 also includes at least one accessory component 60. An example of an accessory component may be a power steering pump, a water pump, a lighting system, a heating and cooling system, which are all conventional and well known in the art. Accessory components 60 are usually mechanically driven by the engine 14 or electrically powered with energy from battery 48. For example, accessory component 60, such as the power steering pump, is operably connected to engine 14 and mechanically driven by engine 14. The lighting system relies on energy supplied by the energy storage apparatus 48, as a source of power. However, according to the present invention, all of the accessory components 60 are electrically powered using energy from the energy storage apparatus 48.

The present invention takes advantage of the kinetic energy available during braking of the motor vehicle and stores it as potential energy in battery 48. In a first direction of power flow, if a braking force is applied to drive wheels 26, the available kinetic energy is directed through drive axles 40 and transmission 18, as the rotational speed of the axle shafts 40, driven shaft 32 and drive shaft 20 decreases. The kinetic energy flows into the electric motor 42, causing it to function as a generator, to produce a regenerative torque, preferably as an A/C current. The A/C current is transmitted to the motor controller 46 which converts it to a D/C current. The D/C current is transferred to the energy storage apparatus 48 for storage as potential energy. If the accessory component 60 requires energy, it is drawn from battery 48, such as in the form of D/C current. This enhances the efficiency of engine 14, since engine 14 is not expending power to operate accessory 60.

In an opposite situation, energy storage apparatus 48 supplies potential energy, such as a D/C current, to motor controller 46, which converts it into an A/C current. The A/C current is directed to the electric motor 42, causing it to act as a motor and produce a positive torque. The positive torque is applied to the transmission 18, which in turn induces the rotation of the axle shafts 40 and the rotation of the drive wheels 26 of the motor vehicle.

Figure 4:
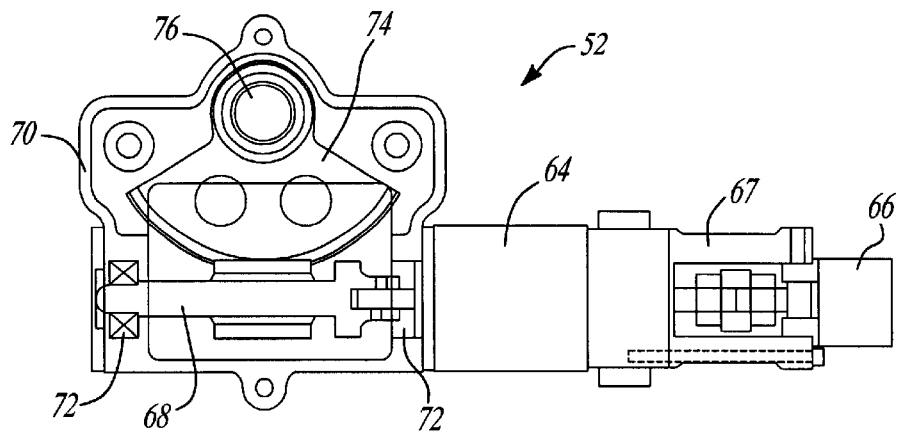
FIG. 4 is a top view of a cross over shift actuator used in accordance with the principles of the present invention.
Figure 5:
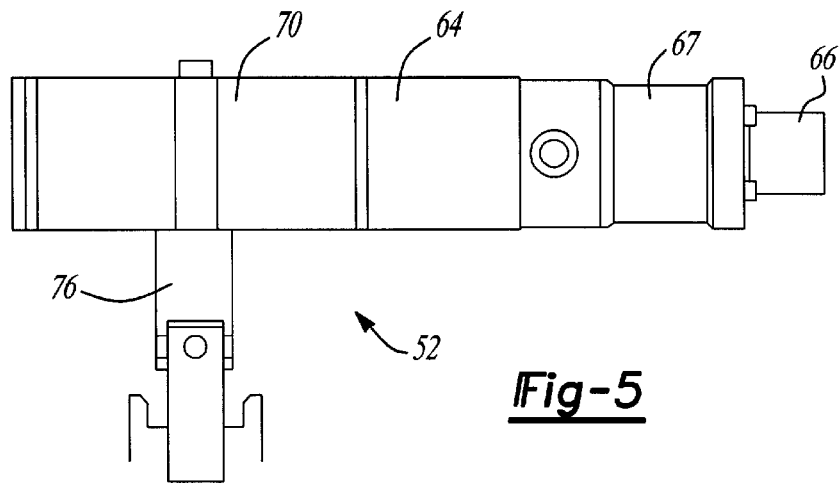
FIG. 5 is a side view of the cross over shift actuator of FIG. 4.
Figure 6:
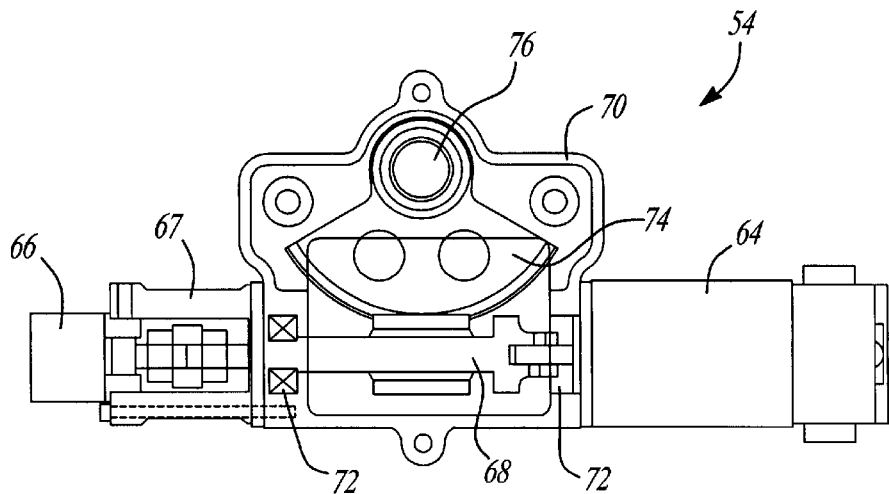
FIG. 6 is a top view of a select shift actuator used in accordance with the principles of the present invention.
Figure 7:
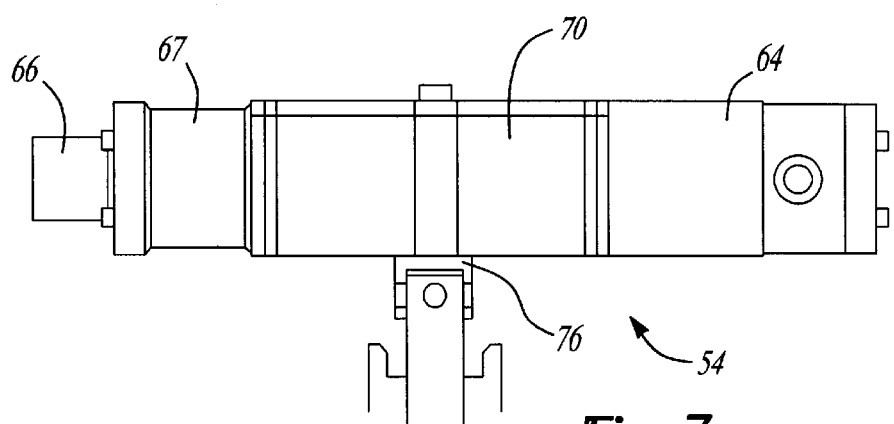
FIG. 7 is a side view of the cross over shift actuator of FIG. 6.

The hybrid powertrain system 10 according to one embodiment of the present invention, as shown, includes a standard five-speed manual transmission 18. The manual transmission is retrofitted with an electro-mechanical clutch actuator 56 which will be described in detail hereinbelow for disengaging the clutch mechanism 16. The cross over shift actuator 52 is shown in FIGS. 4 and 5 and includes a rotary electric motor 64 drivingly engaged with a potentiometer 66 via a coupling housing 67. Electric gear motor 64 is coupled to a worm gear 68 which is rotatably supported within an actuator housing 70 by a pair of bearing assemblies 72. A gear segment 74 engages worm gear 68 and is driven thereby. Gear segment 74 is mounted to an actuator shaft 76 which is rotatably driven. The actuator shaft 76 extends through the housing of the transmission 18 and engages the existing cross over shift mechanism (not shown) of the transmission 18. The actuator housing 70 is mounted to an exterior surface of the transmission housing. The electric motor 64 is connected to the transmission controller 50 and is operably controlled in order to shift the transmission 18.

The select shift actuator 54 is similar to the cross over shift actuator 52 in that the select shift actuator 54 includes an actuator housing 70 which supports a worm gear 68 via bearing assemblies 72. The worm gear 68 engages a gear segment 74 which is attached to an actuator shaft 76 which is inserted through a transmission housing and engages the existing select shift mechanism (not shown) of the manual transmission 18. The select shift actuator 54 (as shown) is different from the cross over shift actuator 52 in that the electric motor 64 is disposed on one side of the actuator housing 70 and is in driving engagement with the worm gear 68. The potentiometer 66 is disposed on an opposite side of the actuator housing 70. In the preferred embodiment as shown, the configurations of the shift actuators 52, 54 were selected in order to provide appropriate spacing for the shift actuators 52, 54 to be mounted to the transmission housing. As discussed above, shift actuators 52, 54 are controlled by the transmission controller 50 in order to mimic the movements of the shift linkage system of the manual transmission.

Figure 3:
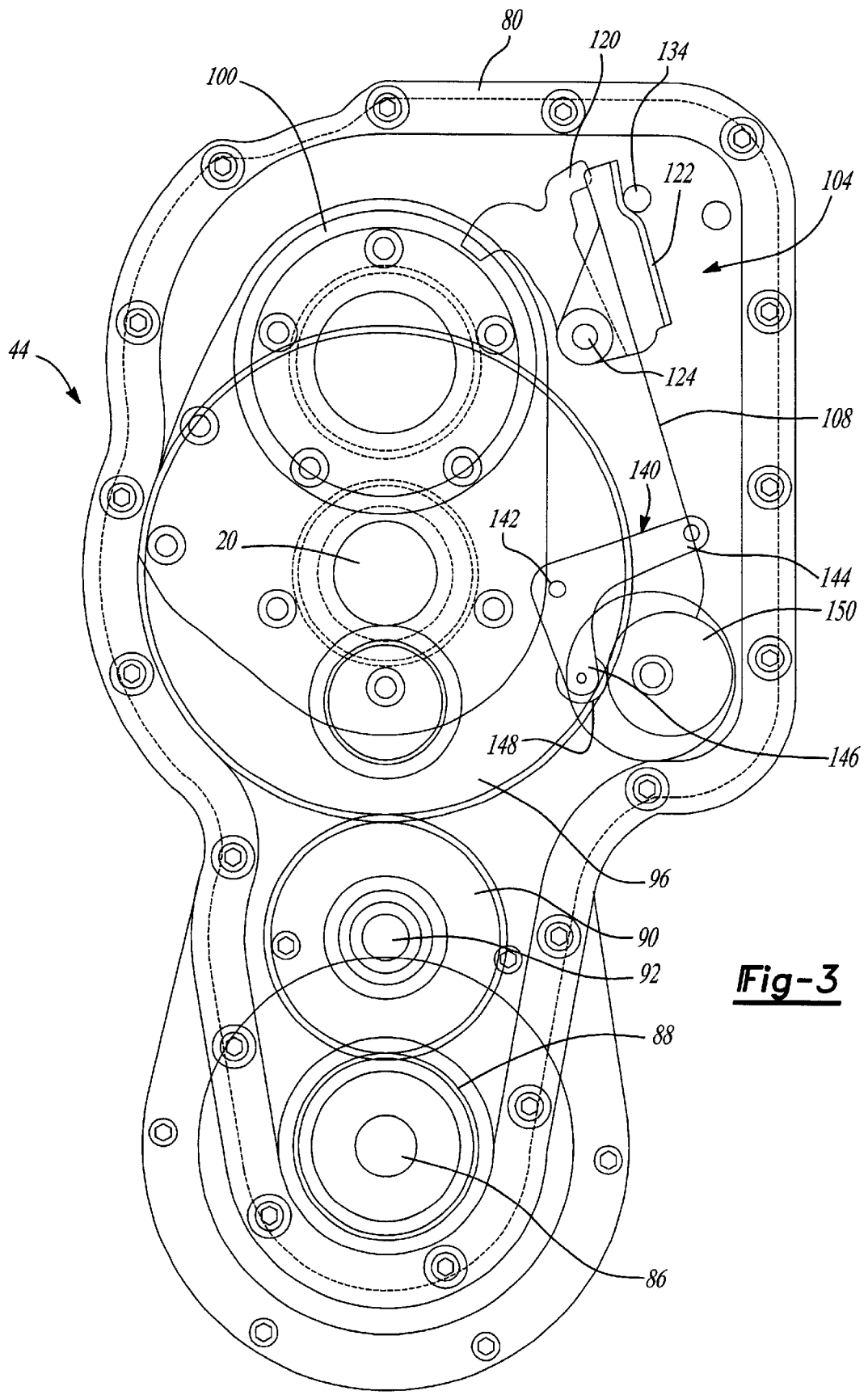
FIG. 3 is a plan view of the gear train connecting the electric motor to the transmission drive shaft.

With reference to FIGS. 1 and 3, the gear train assembly 44 will now be described. The gear train assembly 44 includes a gear train housing 80 which is mounted to the transmission housing 82 via threaded fasteners (not shown). Electric motor 42 is mounted to the gear train housing 80 and includes a motor drive shaft 86. A drive gear 88 is mounted to the motor drive shaft 86. An idler gear 90 is in meshing engagement with drive gear 88 and is supported on an idler shaft 92 which is supported between gear train housing 80 and gear train cover 94. A driven gear 96 is in meshing engagement with idler gear 90. Driven gear 96 is mounted to drive shaft 20 of transmission 18. It should be noted that according to the embodiment shown, the drive shaft 20 has been provided with a shaft extension 98 in order to extend the exiting drive shaft 20 through the transmission housing 84 and into the gear train housing 80. Accordingly, the existing manual transmission 18 has been retrofitted into a hybrid powertrain system by providing an electric motor 42 in driving engagement with the drive shaft 20 via gear train 44.

The members of the consuming public who have preferred automobiles with automatic transmissions have become accustomed to a standard shift lever system which includes a PRNDL shift arrangement. However, it is typical that a manual transmission does not include a park feature. Accordingly, manual transmission vehicles are typically provided with a parking brake which is activated by the driver of the vehicle. Typically, parking brake systems for manual transmission vehicles provide a dual function as an emergency brake which frictionally engages the vehicle wheels to inhibit rotation. In addition, manual transmissions are often placed in gear by the operator after the vehicle engine is turned off in order to provide an effective brake for the vehicle in a parked condition.

Figure 11:
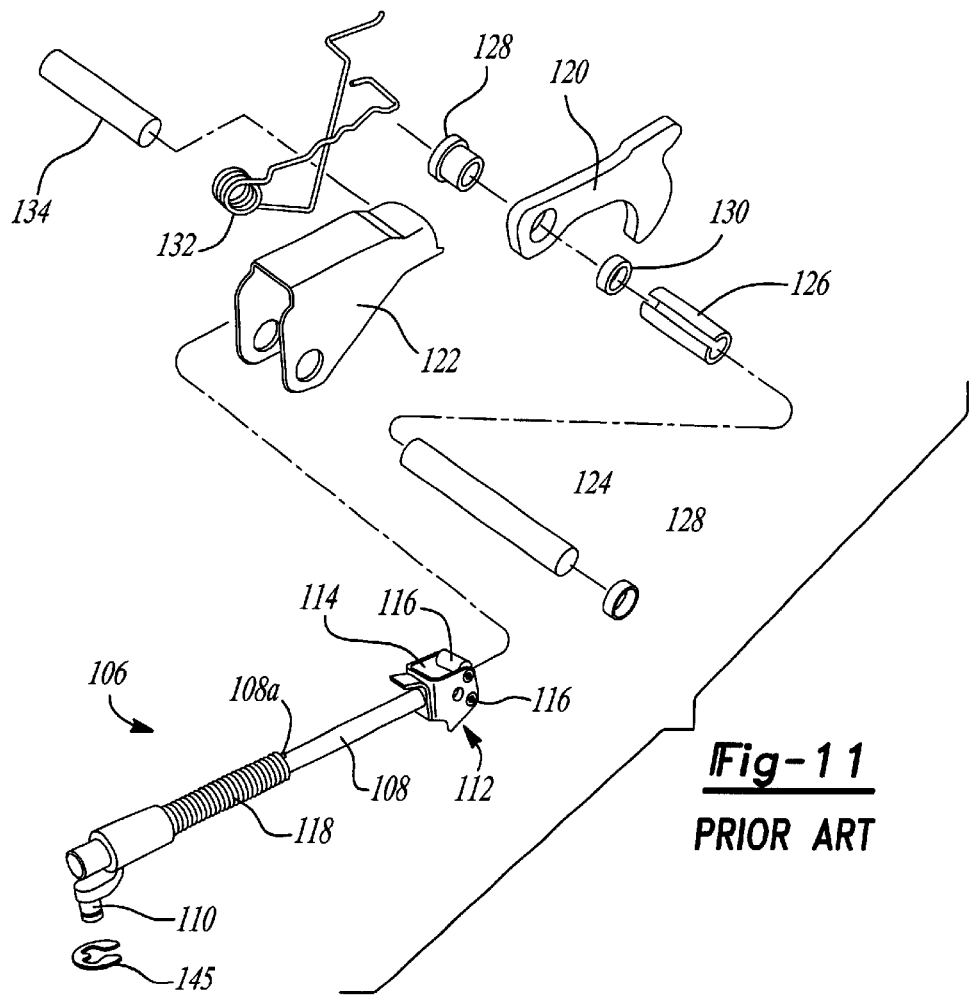
FIG. 11 is an exploded view of the sprag mechanism which is utilized with the present invention.

However, in converting a manual transmission to an automated manual transmission, it is desirable to provide a shift lever which simulates that of a standard automatic transmission including a parking position. Therefore, the present invention provides a parking gear 100 mounted to the driven shaft 32 within the gear train housing 80. The driven shaft 32 includes a shaft extension 102 which extends the driven shaft 32 through the transmission housing 82 and into the gear train housing 80. The parking gear 100 is selectively engaged by a parking sprag assembly 104 which will be described in greater detail hereinbelow. According to a preferred embodiment, the parking sprag assembly 104 is operated electrically. The sprag mechanism 106, as shown in FIG. 11, is known in the prior art. The sprag mechanism 106 includes an activation rod 108 provided with a pivot on one end for attachment to an actuation lever (not shown) and a cam roller assembly 112 is attached to an opposite end of activation rod 108 and includes a housing 114 which rotatably supports a pair of cam rollers 116. A pressure release spring 118 is provided between a detent portion 108a on activation rod 108 and pivot member 110.

A sprag member 120 is attached to a guide bracket 122 via a pivot pin 124. A sleeve 126 is provided on the pivot pin 124 and supports the sprag 120 thereon. A pair of end fittings 128 and a bushing 130 are provided for maintaining the spacing of the sprag member 120 relative to the guide bracket 122. A return spring 132 is provided for biasing the sprag member 120 toward the guide bracket 122. A blocker pin 134 is provided for limiting movement of the guide bracket 122.

Figure 8:
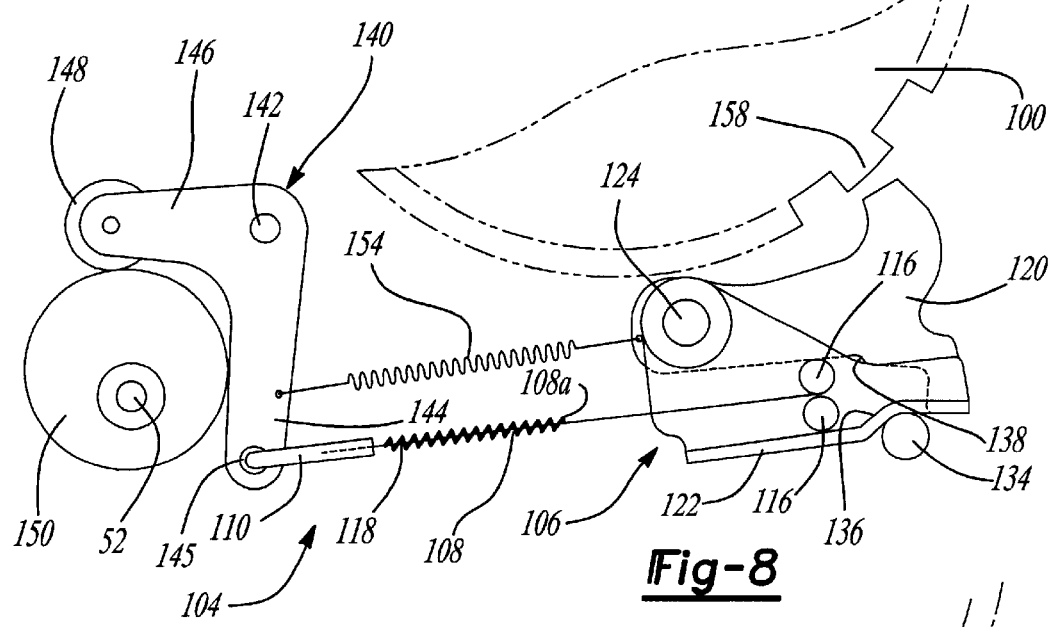
FIG. 8 is a detailed view of a parking sprag assembly in a disengaged position, according to the principles of the present invention.
Figure 9:
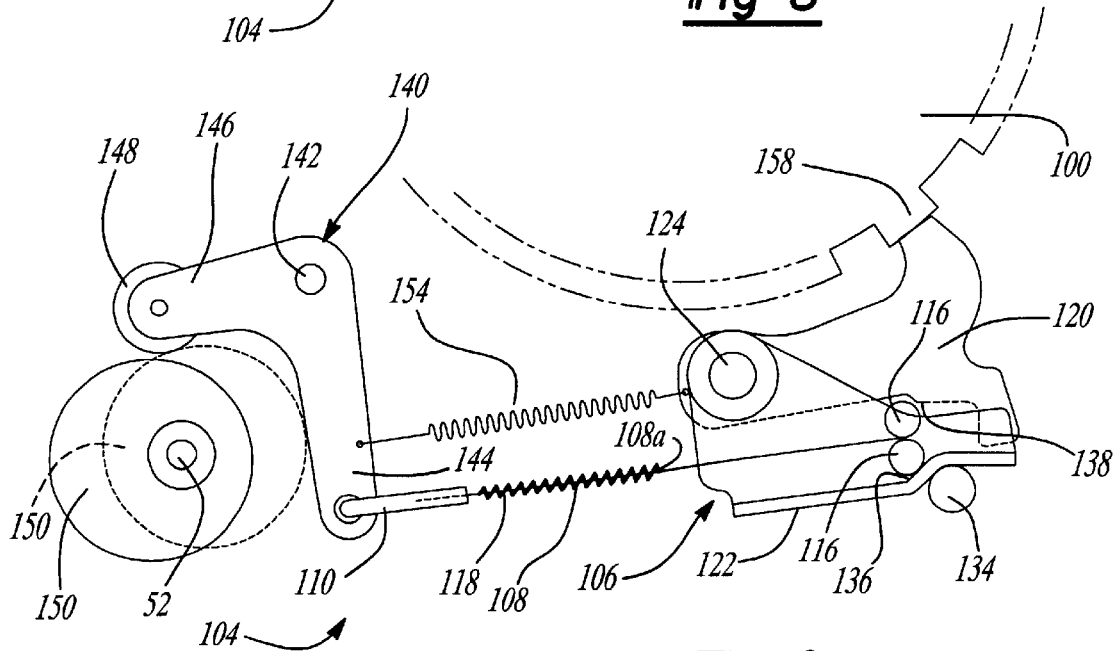
FIG. 9 is a detailed view similar to FIG. 8 with the parking sprag engaging a top portion of a tooth of a parking gear.
Figure 10:
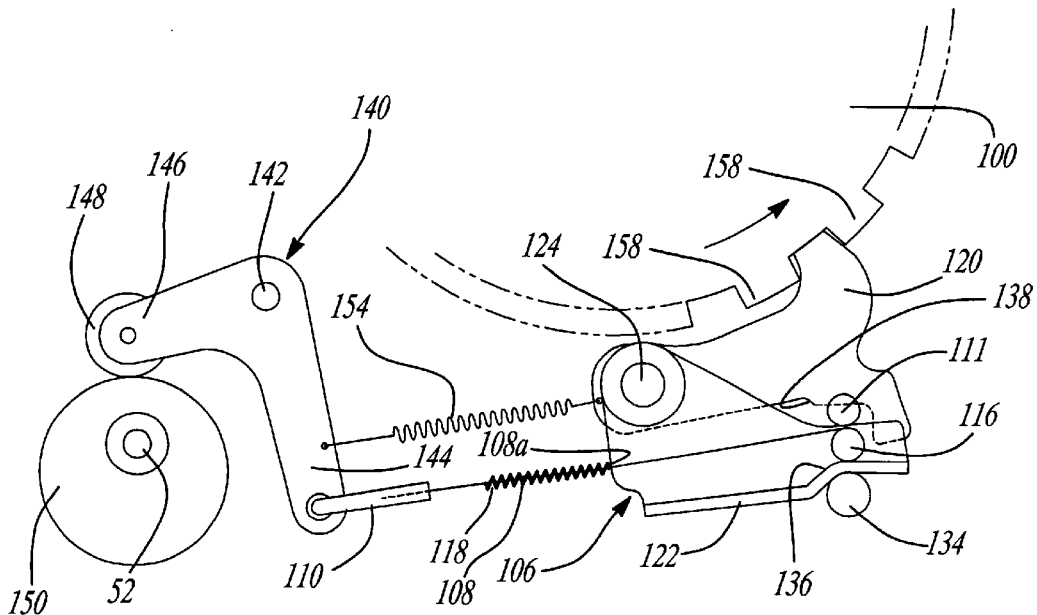
FIG. 10 is a detailed view similar to FIG. 8 with the parking sprag engaged with the parking gear.

As best shown in FIGS. 8–10, the guide bracket 122 includes a cam surface 136 and sprag member 120 includes an opposing cam surface 138. The cam rollers 116 of cam roller assembly 112 are received between cam surfaces 136, 138 of guide bracket 122 and sprag member 120, respectively.

According to the present invention, the activation rod 108 is attached to an actuation lever 140 which is pivotably attached to the gear train housing 80 via pivot pin 142. Lever 140 includes a first arm portion 144 attached to the activation rod 108 and secured thereto by a C-clip 145. Lever 140 includes a second arm portion 146 supporting a cam roller 148 at an end thereof. Cam roller 148 engages a linkage cam member 150 which is rotatably mounted about pivot point 152. A spring 154 is connected between the first arm portion 144 of lever 140 and guide bracket 122. Spring 154 biases lever 140 to rotate in a counter clockwise direction as shown in FIGS. 8–10 so as to maintain cam roller 148 in contact with cam 150. Spring 118 is weaker than spring 154 so that spring 118 does not prevent cam roller 148 from maintaining contact with cam 150 when the spring 118 is in a compressed state.

During engagement of the parking sprag assembly, linkage cam 150 is rotated from the position shown in FIG. 8, wherein the parking sprag is in the disengaged position, to the position as shown in FIG. 9. As linkage cam 150 rotates, lever 140 pivots in a counter clockwise direction causing the cam rollers 116 of roller cam assembly 112 to engage cam surfaces 136, 138 of guide bracket 122 and sprag member 120, respectively. As roller cam assembly 112 is pressed into engagement with cam surfaces 136, 138, sprag member 120 is pressed against the biasing force of return spring 132 toward engagement with parking gear 100.

As shown in FIG. 9, the sprag member 120 may come in contact with a top portion of a tooth 158 of parking gear 100 and will not be allowed to engage the parking gear 100. During continued rotation of linkage cam 150 and corresponding rotation of lever 140, activation rod 108 will continue to place force against roller cam assembly 112 which is pressed against cam surfaces 136, 138 for separating sprag member 120 from guide member 122. The biasing force of spring 154 and pressure release spring 118 will build up as linkage cam 150 rotates while sprag member 120 abuts tooth 158 of parking gear 100. The spring force is such that any rotation of the vehicle wheels 26 which causes rotation of the driven shaft 32 of transmission 18 will cause parking gear 100 to rotate slightly thereby allowing sprag member 120 to engage the teeth 158 of parking gear 100 and affirmatively lock the driven shaft 32 in a parked position.

Figure 12:
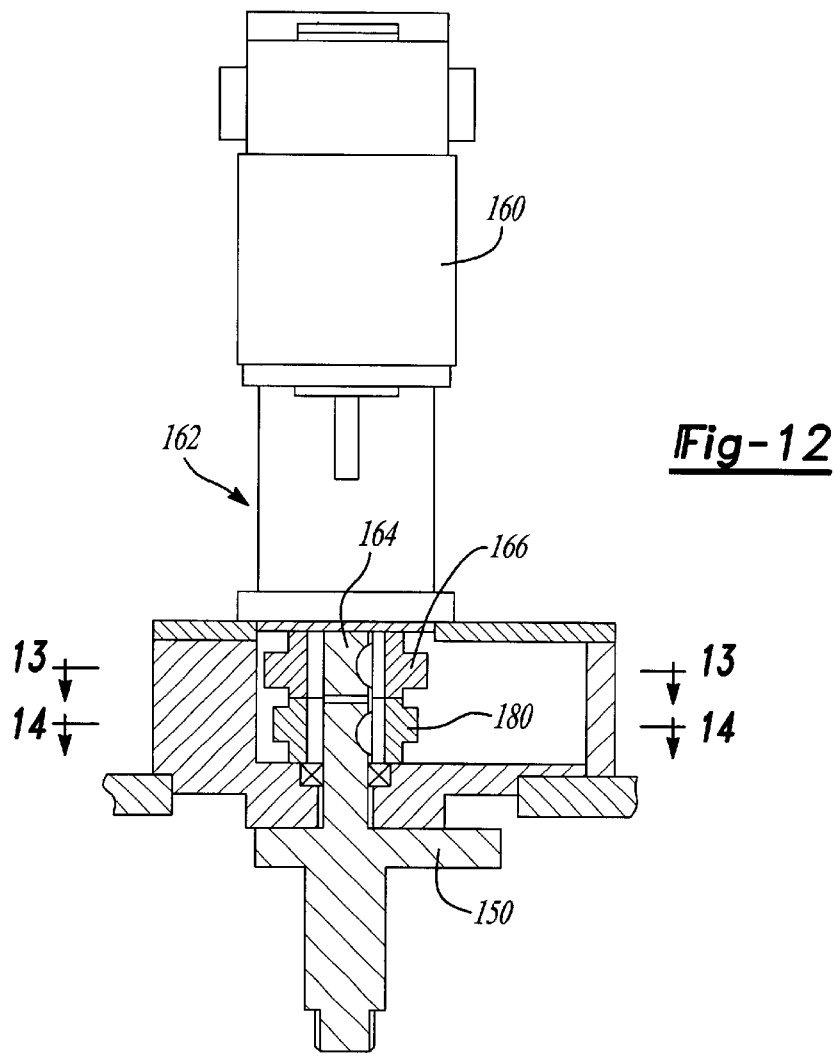
FIG. 12 illustrates the cam linkage drive assembly according to the principles of the present invention.
Figure 13:
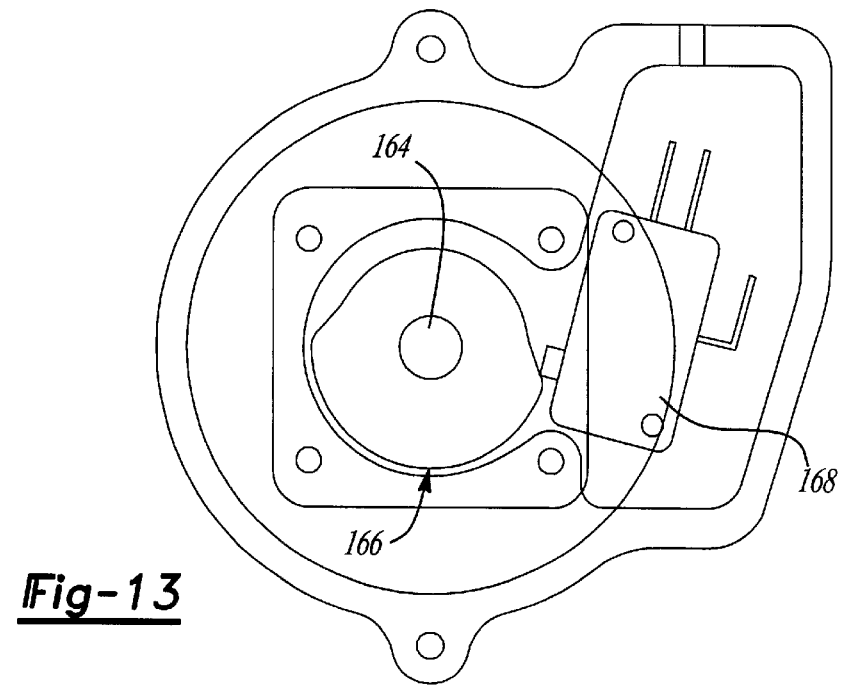
FIG. 13 is a cross-sectional view taken along line 13—13 of FIG. 12 illustrating the second cam and corresponding switch.
Figure 14:
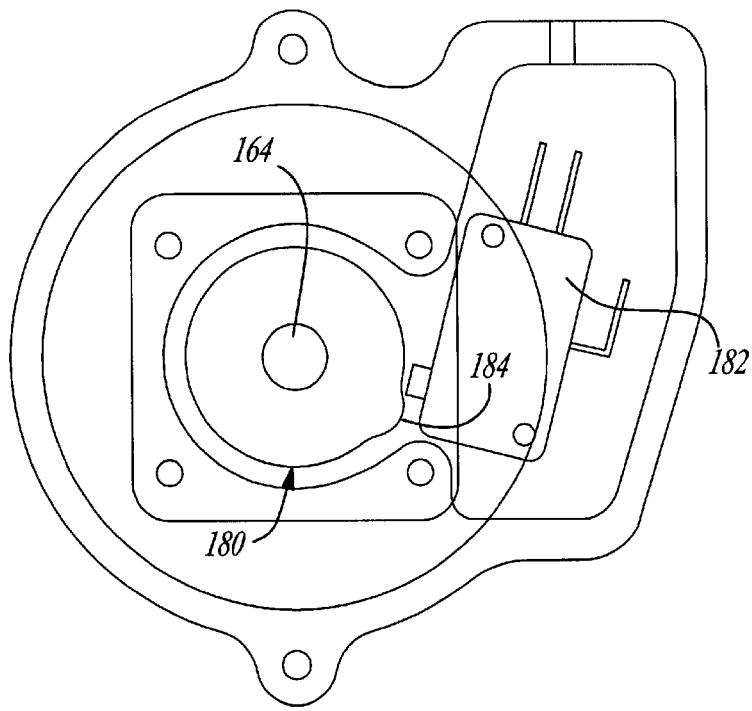
FIG. 14 is a cross-sectional view taken along line 14—14 of FIG. 12 illustrating the third cam and corresponding switch.
Figure 15:
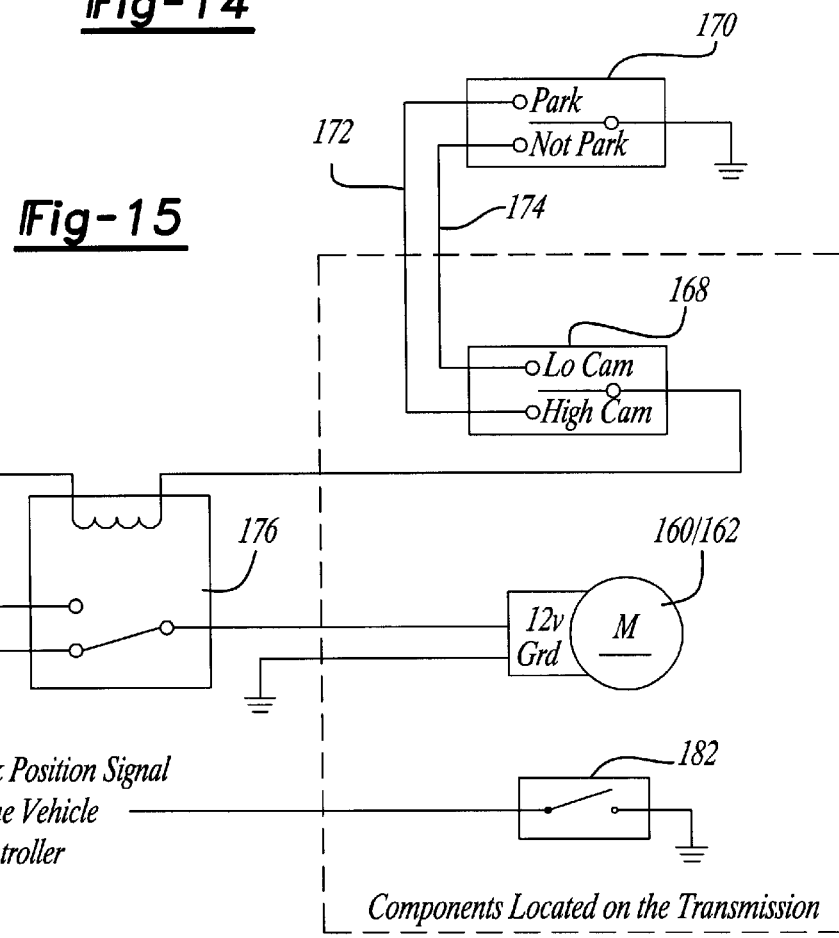
FIG. 15 illustrates the circuitry for controlling the electric parking sprag according to the principles of the present invention.

With reference to FIGS. 12–14, motor 160 is provided for driving a speed reducer 162 which is connected to linkage cam 150 via a coupling shaft 164. A second cam 166 is installed on the coupling shaft 164 between the gear motor 160/162 and the linkage cam 150. The second cam 166 throws a single pole double throw (SPDT) micro switch 168. The second cam 166 is designed to close one pole of the switch 168 for the first 180 degrees of rotation and close the second pole for the next 180 degrees of rotation. FIG. 15 illustrates a control circuit that uses the switch 168 driven by the second cam 166 and a similar SPDT switch 170 mounted to the shifter lever in the passenger compartment. The shifter-mounted switch 170 is thrown when the shift lever is moved into the park position. This closes the first circuit 172. Power is then supplied to a relay 176 that drives the electric gear motor 160/162 until the second cam 166 throws switch 168, opening the first circuit 172. The rotation of the parking linkage cam 150 is then stopped and the sprag member 120 locks the parking gear 100.

When the shift lever is moved from park, the second circuit 174 is closed. Power is then supplied to the relay 176 that drives the electric gear motor 160/162 until the second cam 166 throws its switch 168, opening the second circuit 174. The rotation of the parking linkage cam 150 is then stopped and sprag member 120 unlocks the parking gear 100.

In order to prevent the gear motor inertia from carrying the cam a full 180 degrees past the required stopping point, the relay 176 is designed to short the motor 160 to ground when it is not being driven electrically. This effectively provides an electric braking action which is provided for stopping the gear motor 160/162 as required. In order to help a vehicle control identify whether the parking gear is unlocked and prevents it from trying to launch the vehicle while still in park, a third cam 180 and switch 182 are provided next to second cam 166. The third cam 180 has a lobe 184 which is aligned to indicate when the parking gear is unlocked.

With reference to FIGS. 16–26, the electro-mechanical clutch actuator 56 according to the present invention will be described. The clutch actuator 56 includes an electric motor 212 which provides a rotary drive member which is drivingly engaged with a ball screw assembly 214 via a drive gear 216 mounted on a drive shaft 218 of the electric motor 212. An idler gear 220 is driven by the drive gear 216. Idler gear 220 drives a driven gear 222 which is mounted to a ball screw shaft 224 of ball screw assembly 214. A ball screw nut 226 is disposed on the ball screw shaft 224.

Figure 17:
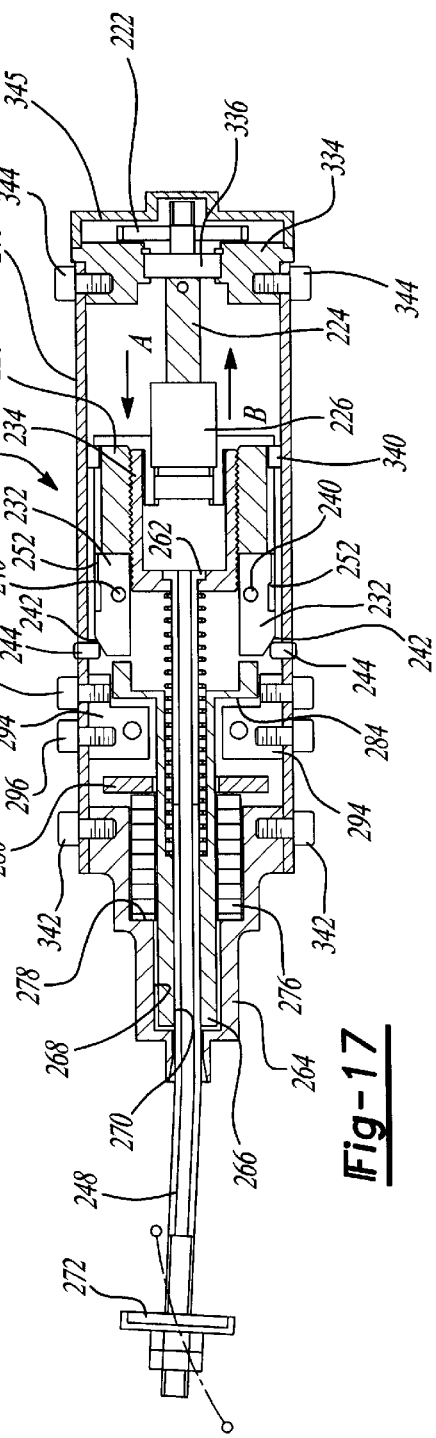
FIG. 17 is a cross-sectional view taken along line 17—17 of FIG. 20 of the electro-mechanical clutch actuator according to the principles of the present invention.
Figure 18:
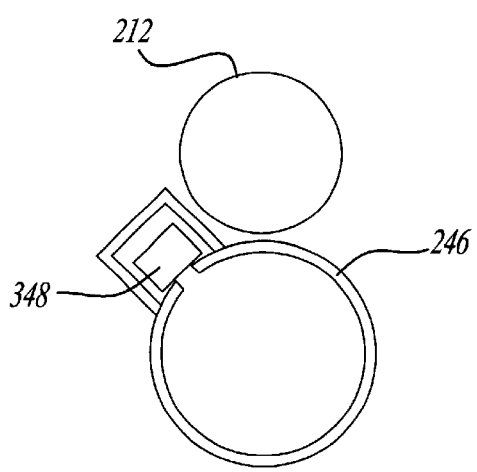
FIG. 18 is an end view of the electro-mechanical clutch actuator according to the present invention with the gear train housing removed.
Figure 19:
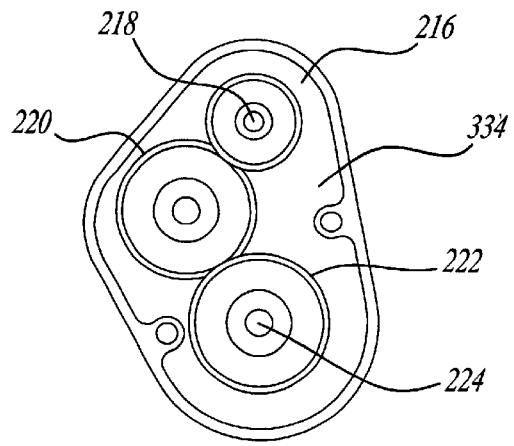
FIG. 19 is a schematic diagram illustrating the relative positioning of the actuator housing, the electric motor and the linear potentiometer.
Figure 20:
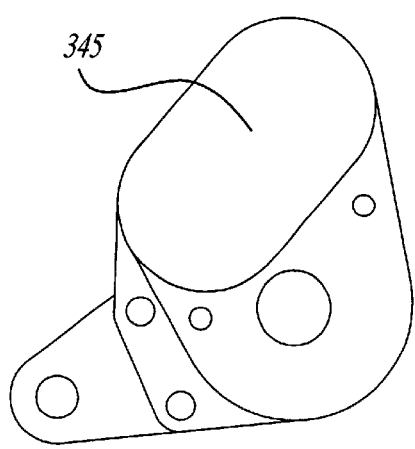
FIG. 20 is an end view of the gear train cover.

A self-adjuster housing 228 is attached to the ball screw nut 226 via an adapter plate 229. The self-adjuster housing 228 serves as a first member of a wear compensator assembly 230. The self-adjuster housing 228 supports a pair of pivot pawls 232 (as seen in FIG. 17) which serve as an engagement mechanism for engaging the self-adjuster housing 228 with a rack 234 having a toothed surface thereon. Rack 234 serves as a second member of the wear adjustment assembly 230. Rack 234 is formed as a generally cylindrical cup-shaped member which is received in a central opening portion 236 of self-adjuster housing 228. Pivot pawls 232 are pivotably mounted to the self-adjuster housing 228 by pivot pins 240. Pivot pawls 232 each include a ramp portion 242 which is engagable with a pair of adjustment retractor members 244 which extend radially inward from an actuator housing 246.

Figure 16:
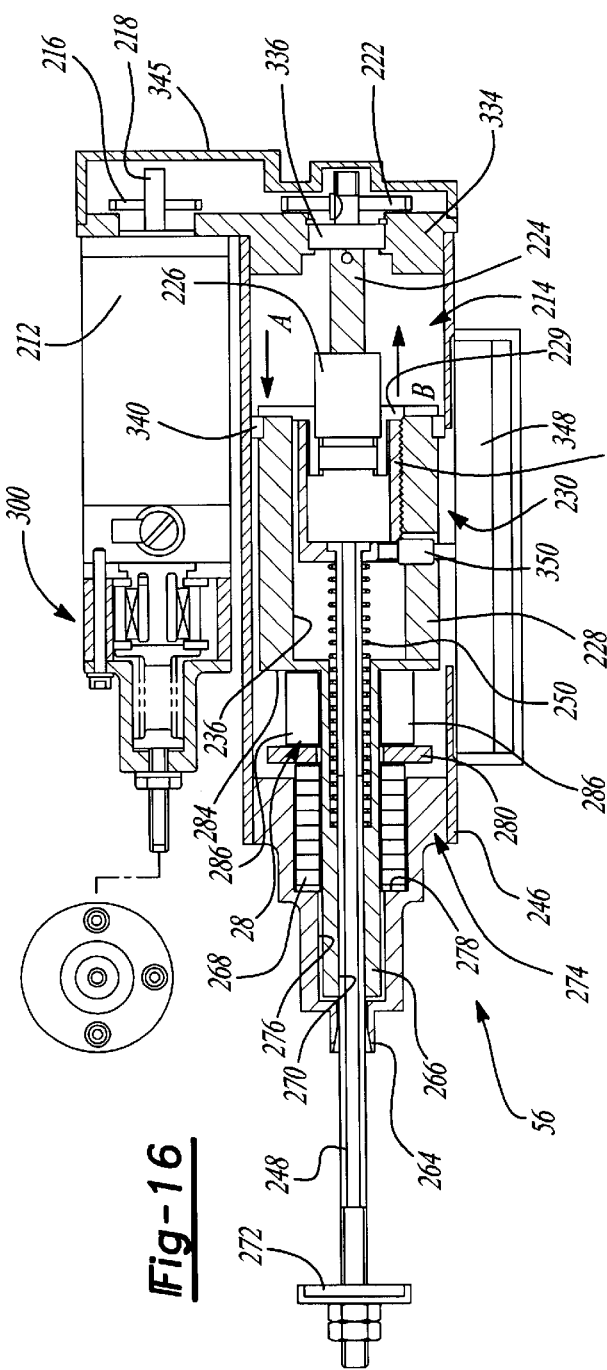
FIG. 16 is cross-sectional view of an electro-mechanical clutch actuator according to the principles of the present invention.

As the self-adjuster housing 228 is moved in the direction of arrow "A" toward the left-most position, as shown in FIGS. 16 and 17, thereby providing slack in the clutch cable 248, the ramp portion 242 of pivot pawls 232 engage the adjuster retractor members 244 causing pivot pawls 232 to pivot about pivot pins 240 and thereby disengage the rack 234. At this time, a preload spring 250 which is disposed between the self-adjuster housing 228 and rack 234 is allowed to extend generally to its relaxed position, thereby pressing the rack 234 relative to the self-adjuster housing 228 and thereby taking out any slack in the clutch cable 248. Accordingly, the wear compensator assembly 230 automatically adjusts the position of the release linkage in order to maintain the same clamp load as the clutch disk wears down over its useful life.

As the electric motor 212 is operated to drive the ball screw assembly 214 and thereby the self-adjuster housing 228 in the direction of arrow B, the ramp portion 242 of locking pawls 232 disengage from the adjustment retractor members 244 and are biased by leaf springs 252 back into engagement with rack 234.

The clutch cable 248 of the present invention is designed to be attached to a clutch disengagement linkage system. For example, FIGS. 24a–24d illustrate a typical clutch linkage system including a release lever 254 which is pivotably mounted to a transmission case. The release lever 254 is attached to a constant contact release bearing 256 which engages a diaphragm spring 258. The diaphragm spring 258 normally biases a clutch disk 260 into an engaged position.

In order to disengage the clutch disk 260, the electric motor 212 is driven and causes rotation of drive gear 216 which in turn drives the idler gear 220 and driven gear 22. Driven gear 222 causes rotation of the ball screw shaft 224 of ball screw assembly 214. Rotation of the ball screw shaft 224 causes axial movement of the ball screw nut 226 in the direction of arrow B. Movement of the ball screw nut 226 causes the self-adjuster housing 228 to move therewith. The self-adjuster housing 228, via engagement with the locking pawls 232, causes the rack 234 to move therewith along with the clutch cable 248. The clutch cable 248, which is attached to release lever 254, causes disengagement of the clutch disk 260.

As a clutch disk 260 wears down over its useful life, the position of the release linkage must be adjusted to maintain the same clamp load. Adjustment is also important because the assist spring force curve should preferably match the clutch disk during the entire wear cycle. Accordingly, the clutch actuator 56 of the present invention is provided with an automatic wear adjustment feature whereby the self-adjuster housing is driven in the direction of arrow A to a predetermined position whereby the ramp portion 242 of locking pawls 232 engage the adjustment retractor members 244 then cause the pivot pawls 232 to pivot about pivot pins 242 and disengage from rack 234. At this point, the pre-load spring 250 presses against the rack 234, so that rack 234 may be moved relative to the self-adjuster housing 228 in the instance that clutch disk wear is sufficient enough to require adjustment. In order to reengage the locking pawls 232 with the rack 234, the electric motor 212 is driven in order to drive the ball screw nut 226 in the direction of arrow B which causes the self-adjuster housing 228 to move therewith thereby causing the locking pawls 232 to disengage from the adjustment retractor members 244. At this time, the leaf springs 252 bias the locking pawls 232 back into engagement with the rack 234, and the actuator is automatically adjusted to compensate for wear of the clutch disk.

The clutch cable 248 is provided with an end fitting 262 which is received through an opening in rack 234. The clutch cable 248 extends through an end piece 264 of actuator housing 246. The self-adjuster housing 228 is provided with an axially extending guide portion 266 which is received within a central bore 268 in the end piece 264. The clutch cable 248 extends through a central opening 270 in the axially extending guide portion 266 of the self-adjuster housing 228. The clutch cable 248 is provided with an end fitting 272 which is connectable with the clutch release lever system described above.

An assist spring/cam assembly 274 is provided between the end piece 264 of the actuator housing 246 and the self-adjuster housing 228. The assist spring/cam assembly 274 includes an assist spring 276 in the form of a coil spring which is seated against a spring seat portion 278 of the end piece 264. A second end of the assist spring 276 is disposed against an assist washer 280 which is movably supported along the axially extending portion 266 of the self-adjuster housing 228. A pair of assist cams 282 are disposed between assist washer 280 and a radially extending wall portion 284 of self adjuster housing 228.

Figure 21:
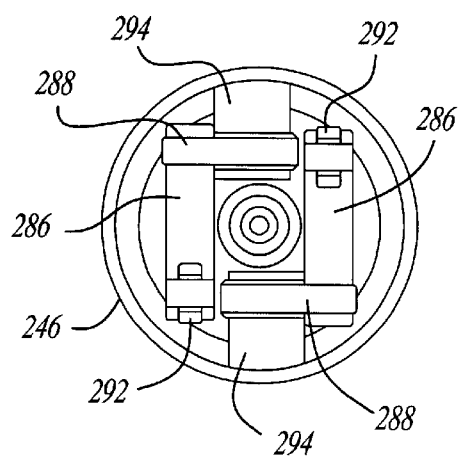
FIG. 21 is a cross-sectional view taken along line 21—21 of FIG. 16, illustrating the assist cam assembly according to the principles of the present invention.
Figure 22:
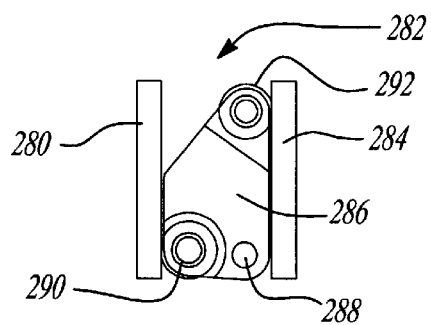
FIG. 22 is a side view of an assist lever of the assist cam assembly according to the principles of the present invention.
Figure 25:
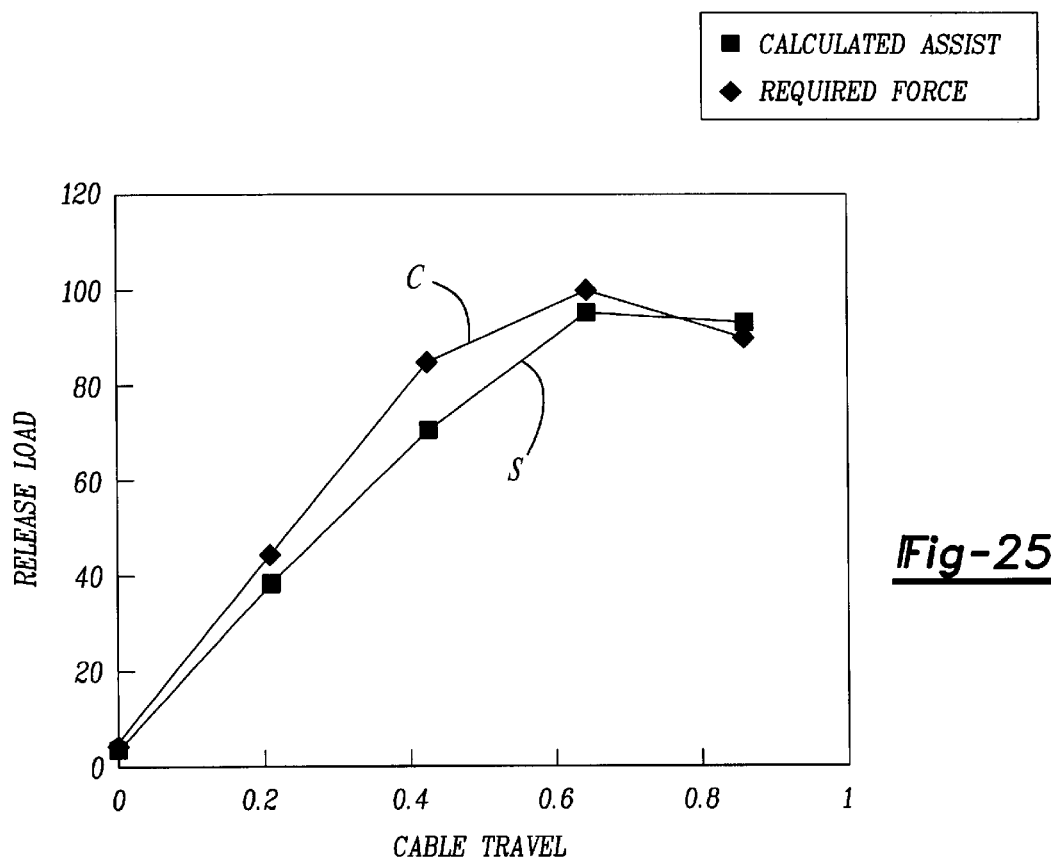
FIG. 25 is a graph illustrating the amount of release load force required for disengaging a clutch as well as the calculated amount of release load assistance provided by the assist spring assembly during various intervals of cable travel.
Figure 26:
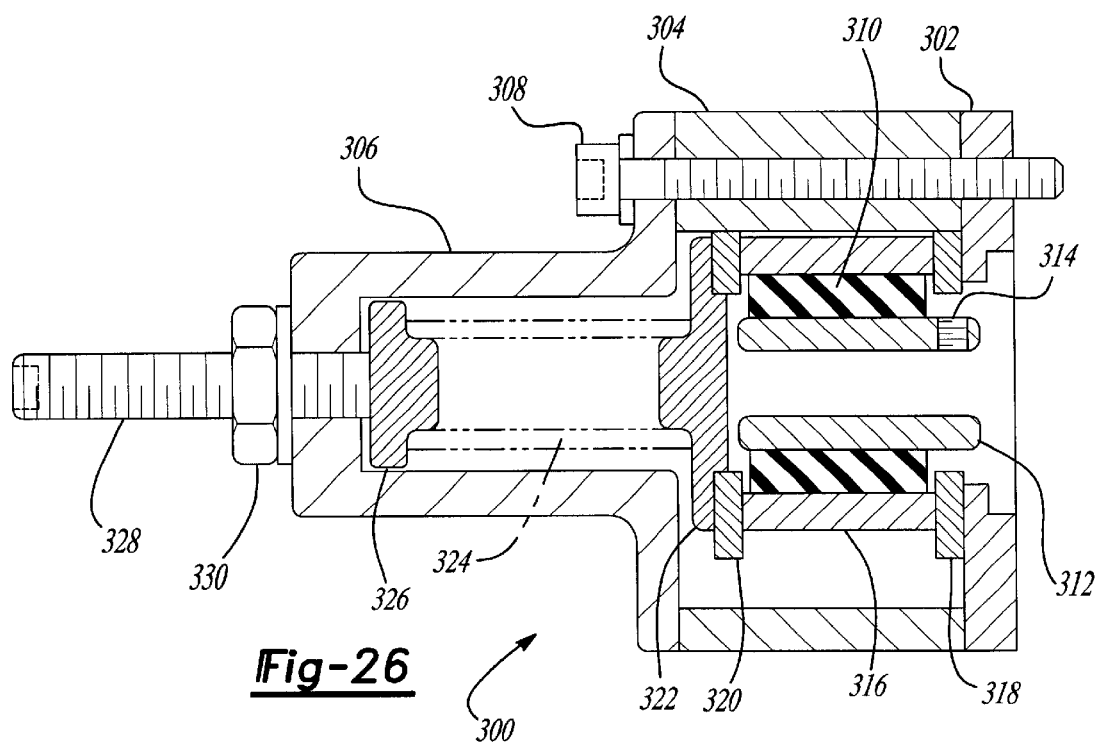
FIG. 26 is a detailed cross-sectional view of the one-way friction clutch utilized in the system of the present invention.

With reference to FIGS. 21 and 22, assist cams 282 each include an assist lever 286 pivotably attached to the actuator housing 246 by a pivot pin 288 and including a first roller 290 disposed against the assist washer 280 and a second roller 292 disposed against the radially extending wall portion 284 of self-adjuster housing 228. The pivot pins 288 of the assist cam assembly 282 are supported by retainer members 294 which are attached to the actuator housing 246 via fasteners 296, as shown in FIGS. 17 and 21.

As the clutch actuator 56 is operated for disengaging the clutch, the assist spring/cam assembly 274 helps to reduce the load on the electric motor. With reference to FIGS. 22 and 23a–23f, the operation of the assist spring assembly will now be described. During normal engagement of the clutch disk 260, the clutch actuator 56 is in a home position. In this state, the assist spring 276 presses against the assist washer 280 which presses against the assist levers 286 by acting on rollers 290. In this position, a very short moment arm "x" exists between the center of the pivot pin 288 and the center of the roller 290, while a maximum moment arm distance "y" is provided between the center of the pivot pin 288 and the center of roller 292. During actuation of the clutch actuator 56, movement of the self-adjuster housing 228 in the direction of arrow B allows the assist lever 286 to rotate about the pivot pin 288 causing an increase in the moment arm "x" and a corresponding decrease in the moment arm "y" during each increment of travel of the self-adjustor housing 228. FIGS. 23a–23f illustrate the changes in the moment arm dimensions at 20% travel intervals during rotation of the assist lever 286. FIG. 10 illustrates the amount of release load assist which is provided by the assist spring/cam assembly 274 in comparison with the amount of release load required for disengaging the clutch disk 260. As can be readily understood by one of ordinary skill in the art, as the length of the moment arms "x" and "y" between each of the rollers 290, 292, respectively, and the pivot pin 288 increase and decrease, respectively, during rotation of the assist levers 286, the amount of release load assist that can be generated by the assist spring/cam assembly 274 also increases. This allows the spring assist force curve "s" to closely match the clutch load curve "c".

Due to the low friction on the actuator system and the possible mismatch of the assist spring load to the clutch load, there is a possibility for the clutch actuator unit to back drive when the actuator is stopped during mid-stroke. To eliminate this possibility, a one-way friction device 300 is attached to the motor drive shaft 218. With reference to FIG. 11, the one-way friction device 300 is shown. The one-way friction device 300 includes a housing base plate 302 which is attached to the electric motor 212. A friction brake housing 304 is mounted to the housing base plate 302 and a spring housing 306 is attached to the friction brake housing 304 via a set screw 308. A roller clutch 310 is disposed within the friction brake housing 304. Roller clutch 310 includes a roller clutch shaft 312 which is attached to the motor drive shaft 218 via a set screw which is inserted through the socket head 314. Anti-friction bushing 316 is disposed circumferentially around the roller clutch 310 and is sandwiched between first and second friction plates 318, 320. Friction plate 318 is disposed between the friction bushing 316 and the housing base plate 302. Friction plate 320 is disposed between the friction bushing 316 and a spring bottom seat member 322. The spring bottom seat member 322 is biased by a compression spring 324 which is seated against the spring bottom seat member 322 and a spring top seat member 326. The spring top seat 326 is attached to a set screw 328 which is received through an opening in the spring housing 306. A jam nut 330 is provided on the set screw 328 to adjustably support the set screw 328 in an axial position relative to the spring housing 306. By adjustment of the jam nut 330, the spring top seat 326 can be moved in an axial direction to increase or decrease the amount of compression force on compression spring 324 and can thereby alter the friction resistance provided by the one-way friction device 300.

The electric motor 212 is attached to the actuator housing 246 by a motor mounting plate 334. An end portion of the ball screw shaft 224 is supported by the motor mounting plate 334 by a bearing assembly 336. A second end portion of the ball screw shaft 224 is supported via a bearing assembly 338 which is secured within adapter plate 229. The self-adjuster housing 228 is slidably supported within the actuator housing 246 by an actuator bearing 340. The end piece 264 is mounted to the actuator housing 246 by threaded fasteners 342, as shown in FIG. 17. The actuator housing 246 is also attached to the motor mounting plate 334 by fasteners 344. A gear train housing 345 is attached to the motor mounting plate 334 for covering the drive gear 216, the idler gear 220, and the driven gear 222.

A linear potentiometer 348 is provided to measure the travel of the actuator and give closed loop control of the actuator. The potentiometer 348 is mounted on the actuator housing 246 and measures the position of the clutch linkage. A linear potentiometer 348 as used in accordance with the present invention is available from Maurey Instrument Corp., Chicago, Ill. 60629. The linear potentiometer 348 measures the travel of the actuator and gives closed loop control. The potentiometer 348 is mounted on the actuator and measures the position of the clutch linkage. Since the potentiometer drive pawl 350 is connected downstream of the wear compensator 230, the wear of the clutch 260 can be measured. This will allow the control computer to adjust for changing modes as the clutch 260 wears and will also allow for the computer to determine when the clutch 260 is worn out.

The ball screw assembly 214 has an overrunning feature at each end of its stroke. The overrunning feature allows the ball screw assembly 214 to be operated to drive the ball screw nut 226 to the end of its stroke in order to zero-in the potentiometer travel. The motor is run against its stop for a short duration to ensure that the wear adjustment is complete and then the potentiometer reading is taken. This is used for the starting point for the release travel. The ball screw assembly having an overrunning feature is available from Motion Systems Corporation, Eaton Town, N.J. 07724. With conventional ball screw assemblies which do not have the overrunning feature, the ability to drive the ball screw nut 226 to the end of the shaft 224 is limited due to the fact that if the ball screw nut 226 is driven too tightly against the end, a lock-up may occur. Therefore, with the overrunning feature, any lock-up associated with a standard ball screw assembly can be avoided, and a zeroing-in of the potentiometer travel can be properly achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of converting an existing vehicle powertrain including a manual transmission to a hybrid powertrain system with an automated manual transmission including the steps of:

attaching a gear train housing to a housing of said manual transmission, said gear train housing receiving an end of a drive shaft of said transmission and rotatably supporting a gear train assembly;

mounting an electric motor/generator to said gear train housing and attaching a motor/generator drive shaft of said electric motor/generator to said gear train assembly; and connecting an electro-mechanical clutch actuator to a friction clutch mechanism of said manual transmission, wherein said electro-mechanical clutch actuator includes a motor driven ball screw assembly.

2. The method according to claim 1, further comprising the step of attaching an electro-mechanical shift actuator to a gear shifting mechanism of said manual transmission.

3. A method of converting an existing vehicle powertrain including a manual transmission to a hybrid powertrain system with an automated manual transmission including the steps of:

attaching a gear train housing to a housing of said manual transmission, said gear train housing receiving an end of a drive shaft of said transmission and rotatably supporting a gear train assembly;

mounting an electric motor/generator to said gear train housing and attaching a motor generator drive shaft of said electric motor/generator to said gear train assembly;

connecting an electro-mechanical clutch actuator to a friction clutch mechanism of said manual transmission; and attaching an electro mechanical shift actuator to a gear shifting mechanism of said manual transmission, wherein said electro-mechanical shift actuator includes an electric motor attached to a first gear element which drivingly engages a second gear element which is attached to said gear shifting mechanism of said manual transmission.

4. The method according to claim 1, wherein said electro-mechanical clutch actuator includes an assist spring assembly.

5. The method according to claim 1, wherein said electro-mechanical clutch actuator includes a mechanical wear compensator for compensating for clutch disk wear.

6. The method according to claim 1, further comprising the steps of mounting a parking gear to said transmission driven shaft and mounting a parking sprag to said gear train housing for selectively engaging said parking gear.

7. A method of converting an existing vehicle powertrain including a manual transmission to a hybrid powertrain system with an automated manual transmission including the steps of:

attaching a gear train housing to a housing of said manual transmission, said gear train housing receiving an end of drive shaft of said transmission and rotatably supporting a gear train assembly;

mounting an electric motor/generator to said gear train housing and attaching a motor/generator drive shaft of said electric motor/generator to said gear train assembly;

connecting an electro-mechanical clutch actuator to a friction clutch mechanism of said manual transmission; and attaching an electro-mechanical shift actuator to a gear shifting mechanism of said manual transmission.

* * * * *